Aug. 8, 1950 S. B. STREILER 2,517,806
COMBINATION TOOTHBRUSH HANDLE AND DENTAL FLOSS HOLDER
Filed March 10, 1947
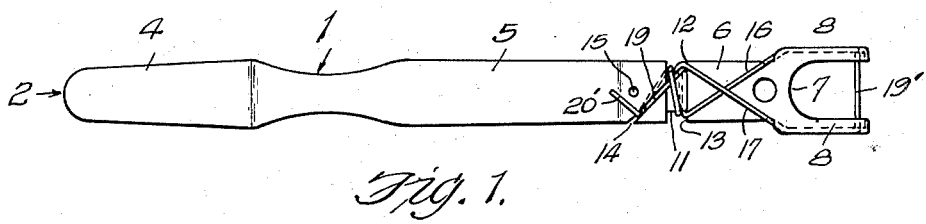
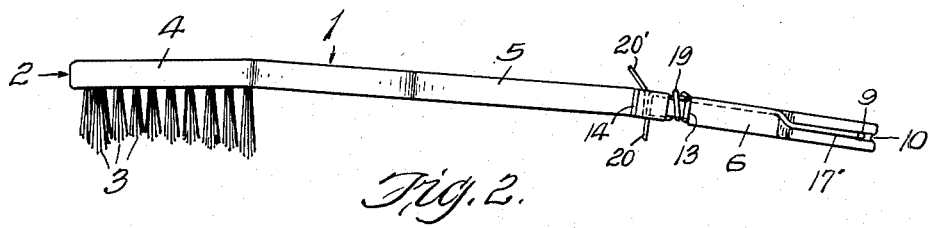
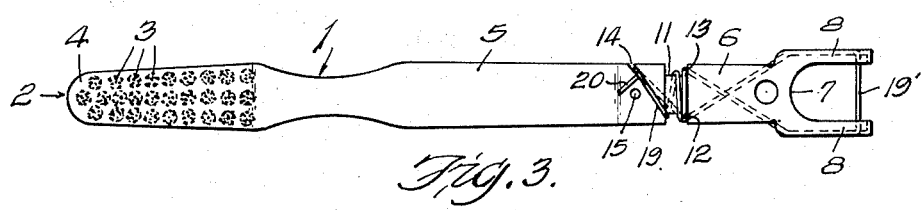
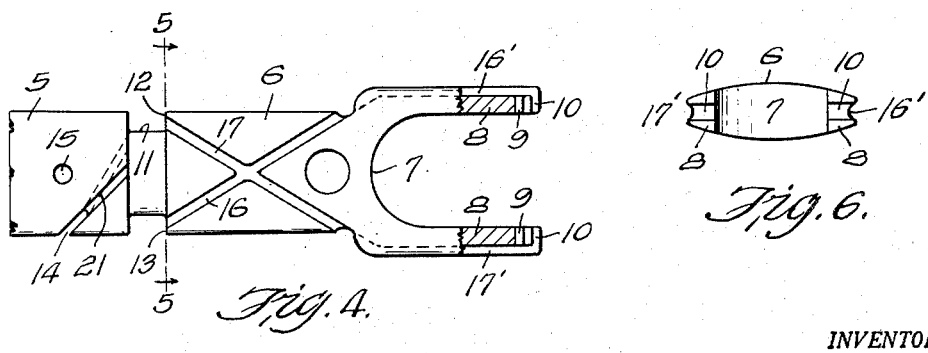
INVENTOR:
SYLVESTER B. STREILER
BY
ATTORNEY.

Patented Aug. 8, 1950

2,517,806

UNITED STATES PATENT OFFICE 2,517,806

COMBINATION TOOTHBRUSH HANDLE AND DENTAL FLOSS HOLDER

Sylvester B. Streiler, St. Louis, Mo.

Application March 10, 1947, Serial No. 733,573

1 Claim. (Cl. 132—91)

This invention relates to a combination tooth brush and dental floss holder.

The primary object of the invention is in the provision of an article of the character having a handle provided at one end with the usual tufts of teeth brushing bristles, whereby one end of the article can be used for brushing and cleaning the teeth in the usual manner, and, whereby the opposite end of the handle is provided with a length of readily attachable and detachable dental floss for use in removing food particles lodged between adjacent teeth in the mouth.

A further object of the invention resides in providing the free end of the handle opposite the brush carrying end thereof, with spaced members providing a gap across which is adapted to span a length of dental floss, the ends of which floss lies in facial grooves in the handle and anchored at each end to the handle.

A still further object of the invention resides in providing the handle, adjacent the juncture of angularly disposed portions thereof, with a pair of opposed dental floss engaging shoulders, a dental floss anchoring slit adjacent one of the shoulders and one, or more dental floss anchoring openings in the handle adjacent the shoulders.

The embodiment of the invention herein disclosed is merely illustrative, and may be modified and departed from in various ways without departing from the spirit and scope of the invention, as pointed out hereinafter, and limited solely by the appended claim.

To the attainment of the above stated objects and others which will appear as the nature of the invention is better understood, the invention further resides in the novel features of construction, combination and association of parts, a practical embodiment of which is disclosed by the accompanying drawing.

Referring to the drawing:

Fig. 1 is a top plan view of the article for brushing and/or removing food particles from between adjacent teeth, and embodying the features of the invention.

Fig. 2 is a side elevation of the dental article.

Fig. 3 is a bottom plan view of the device.

Fig. 4 is an enlarged detail of one end of the handle of the device, minus a length of dental floss adapted to be attached thereto.

Fig. 5 is a sectional view taken on line 5—5 of Fig. 4.

Fig. 6 is an enlarged end view of the article.

In carrying the invention into practice, I employ a handle designated, generally, as 1, having a tooth cleaning brush designated, generally as 2, which in the embodiment illustrated in the drawing is formed of several longitudinal spaced rows of tufts of suitable tooth brush bristles 3 arranged in suitable spaced relation longitudinally of the brush end 4 of the handle 1, as is the common practice in tooth brush manufacture.

A portion designated 5 of the handle 1 is angularly disposed with relation to the plane of the handle portion 4, and a portion 6 of the handle 1 is angularly disposed with relation to the plane of the handle portion 5 to facilitate the use of a taut working length of dental floss detachably connected to the handle portion 5 for the removal of food particles between adjacent teeth in the mouth of the user of the article hereinafter more fully described.

The free end of the angular handle portion 6 of the handle is slightly widened and bifurcated to provide a recess, or gap 7 open to the free end of the handle portion 6 and provide thereby two spaced arms 8 which are provided with aligned openings 9 adjacent the end faces of the arms 8, and the arms 8 may also have their end faces provided with aligned grooves 10.

The handle portion 6 of the handle 1 adjacent the juncture thereof with the handle portion 5, is provided with a circumferential groove 11 forming a pair of opposed shoulders 12 and 13 on opposite sides of the handle portion 6 and disposed transversely thereof.

Adjacent the shoulder 13, the handle portion 6 is provided with a suitable narrow slit 14 and the handle is further provided with a suitable opening 15 open to the upper and lower faces thereof adjacent the slit 14.

The upper face of the handle portion 6 is further provided with a pair of facial grooves designated 16 and 17 which lead from their respective shoulders 12 and 13 to the side faces of the arms 8 adjacent the inner ends of the arms 8 and the grooves cross each other on the handle portion 6, as at 18. The grooves continue along the outer faces of the arms 8, as at 16' and 17' and terminate at the ends of the arms to join with the facial grooves 10 in the end faces of the arms 8 and to pass the holes 9.

The reference character 19 designates a length of dental floss which may be cut to a predetermined length from a roll of floss, or it may be purchased in properly cut lengths.

The length of floss is attached at one end thereof, as at 20, to the handle portion 6 by being frictionally received in the slit 14 which anchors each end of the floss to the handle. The length of floss is carried across the top face of the handle portion 6 in a groove 21 to the circumferential groove 11, then wound under the handle in the groove 11 and brought upwardly to engage one of the shoulders 13. From the top edge of the shoulder 13, the floss is carried diagonally across the handle portion in the groove 16 and then carried into the outer facial groove 16' in one of the arms 8, from where it is either threaded through the aligned openings 9 in the arms 8, or the facial end grooves 10. The floss is then positioned in the outer facial groove 17' in the other arm 8 and carried to and along the other facial groove 17 in the upper face of the handle portion 6 to the shoulder 12. The floss is then carried downwardly to engage the shoulder 12 and then wound one or more times around the handle in the groove 11 and finally the end 20 thereof is anchored in the slit 14 to securely hold that portion of the floss spanning the gap 7 between the arms 8 taut for use in removing particles of food lodged between adjacent teeth in the mouth of the user thereof.

The ends of the length of floss may be passed through the hole 15 in opposite directions and tied together, which is not believed necessary to illustrate, to further secure the ends of the floss to the handle, if so desired.

From the foregoing description, it is clearly apparent that the many advantages of the invention will readily suggest themselves to those skilled in the art to which it appertains, and that the production of such an article of manufacture will be especially adaptable to and capable of a maximum number of uses, which is easily constructed and operated, speedy and simple in its uses, economical, and otherwise satisfactory and efficient for the uses for which the article is designed.

What I claim is:

A tooth brush handle provided with a bifurcated free end portion having the outerside and end faces provided with dental floss receiving grooves, the handle having a peripheral floss receiving groove a short distance from the inner end of the bifurcated free end portion to provide an intermediate handle portion having the back face thereof provided with crossed floss receiving grooves communicating, at their inner ends with one of the side walls of the peripheral groove on the handle, and at their outer ends with the grooves on the outerside faces of the bifurcated end portion of the handle, one side edge of the handle having an angularly arranged floss receiving slit terminating in a back facial groove open to the other side wall of the peripheral groove opposite the side thereof with which the inner ends of the crossed grooves communicate, and said handle having a medial opening adjacent the floss receiving slit.

SYLVESTER B. STREILER.

REFERENCES CITED

The following references are of record in the file of this patent:

UNITED STATES PATENTS

| Number | Name | Date |
|---|---|---|
| 1,257,864 | Hochstadter | Feb. 26, 1918 |
| 1,658,221 | Brown | Feb. 7, 1928 |
| 1,832,173 | Yates | Nov. 17, 1931 |
| 2,013,143 | Getz | Sept. 3, 1935 |
| 2,067,889 | Collingbourne | Jan. 19, 1937 |
| 2,113,439 | Bean | Apr. 5, 1938 |
| 2,233,936 | Campbell | Mar. 4, 1941 |
| 2,376,750 | Bell | May 22, 1945 |

FOREIGN PATENTS

| Number | Country | Date |
|---|---|---|
| 384,416 | France | Apr. 8, 1908 |